(12) United States Patent
Suzuki

(10) Patent No.: US 6,280,173 B1
(45) Date of Patent: Aug. 28, 2001

(54) APPARATUS FOR MOLDING DISC-LIKE RICE FOOD

(76) Inventor: Kisaku Suzuki, 2-Chome, 3-15, Shinju-ku, Tokyo (JP)

( * ) Notice: Subject to any disclaimer, the term of this patent is extended or adjusted under 35 U.S.C. 154(b) by 0 days.

(21) Appl. No.: 09/316,089

(22) Filed: May 21, 1999

(30) Foreign Application Priority Data

May 28, 1998 (JP) .................................................. 10-164245

(51) Int. Cl.[7] ....................................................... A23P 1/10
(52) U.S. Cl. ..................... 425/364 R; 425/394; 425/397; 425/451.3; 426/512
(58) Field of Search ............................... 425/364 R, 394, 425/397, 403, 451.3; 426/512

(56) References Cited

U.S. PATENT DOCUMENTS

| | | | |
|---|---|---|---|
| 3,177,822 | * 4/1965 | Archer et al. | 425/364 R |
| 3,411,461 | * 11/1968 | Groth | 425/397 |
| 4,460,611 | * 7/1984 | Suzuki | 426/512 |
| 5,137,745 | * 8/1992 | Zukerman et al. | 426/512 |
| 5,431,942 | * 7/1995 | Baird | 426/512 |

FOREIGN PATENT DOCUMENTS 4-108351 * 4/1992 (JP) .................................. 425/364 R

* cited by examiner

*Primary Examiner*—Robert Davis
(74) *Attorney, Agent, or Firm*—Israel Gopstein

(57) ABSTRACT

Provided is a molding apparatus having a low cost, including an intermittent feed belt conveyer which can be moved back and forth, for transferring compressed rice foods having a predetermined shape and fed thereonto, a molding frame composed of a pair of openable and closable molding dies having opposed parts formed therein with substantially semicircular molding recesses which are outward symmetric, and a plurality of press boards fixed to push-down rods so as to be horizontally extend and elevatable in the molding recesses in a condition in which both molding dies are closed, and an opening and closing mechanism and an elevating mechanism for the molding frame, wherein the molding dies are arranged so that the molding recesses are juxtaposed with each other, being spaced from one another by a predetermined distance widthwise of the intermittent feed belt conveyer.

1 Claim, 8 Drawing Sheets

APPARATUS FOR MOLDING DISC-LIKE RICE FOOD

BACKGROUND OF THE INVENTION

1. Field of the Invention

The present invention relates to an automated apparatus for molding a disc-like rice food used in pizza rice, rice burgers, rice sandwiches or the like.

2. Related Art

Hitherto, it has been known that rice grain is molded into a disc-like shape, and is then used in, for example, pizza rice in which various toppings are set on the upper surface thereof, a rice burger in which a hamburger is sandwiched between two disk-like rice foods, or a rice sand in which various ingredients are sandwiched between two disc-like foods.

Conventionally, the above-mentioned disc-like foods have been formed through a manipulation work in which the formation of the rice food having a predetermined shape and a predetermined degree of hardness is difficult and time-consuming, and accordingly, there has been possibly raised a problem such that it is difficult to supply for great demand.

Thus, in order to satisfactorily supply for great demand, it has been proposed an automated apparatus for molding disc-like rice foods.

This molding apparatus has such a structure that a planer rice food having a predetermined shape (such as a substantially square shape) and conveyed by an intermittent feed belt conveyer is pressed by closing a pair of molding dies having semicircular shapes in which the dies are symmetrically curved outward, and accordingly, a circular shape rice food in a plan view, is obtained by these two molding dies. Then, a press is lowered to compress the same so as to obtain disc-like rice foods.

However, the above-mentioned molding apparatus has possibly raised such a problem that the efficiency of the molding is limited since the this apparatus cannot produce more than one of rice foods at a time, and accordingly, it does not seems to satisfactorily supply great demands of disc-like molded rice foods.

SUMMARY OF THE INVENTION

The present invention is devised in view of the above-mentioned problems inherent to the prior art apparatus, and accordingly, one object of the present invention is to provide an automated apparatus for molding disc-like molded rice foods with a high degree of quality, having a predetermined hardness and a predetermined shape and having a remarkably enhanced efficiency of molding thereof.

To the end, according to the present invention, there is provided a disc-like molding apparatus comprising an intermittent feed belt conveyer which can be moved back and forth in a longitudinal direction, for conveying a predetermined shape planar rice food which has been compressed and fed onto the conveyer; a molding frame comprising a pair of closable molding dies having opposed parts formed therein with molding recesses which are outward symmetric and which have semicircular shapes, and a plurality of presses horizontally fixed to a push-down rod and provided so as to be elevatable in both molding recesses in a closed condition of both molding dies; and an opening and closing mechanism and an elevating mechanism for the above-mentioned molding frame, wherein the above-mentioned both molding dies are arranged in a juxtaposed relation in which the molding recesses are spaced from each other by a predetermined distance therebetween in a direction widthwise of the intermittent feed belt conveyer.

Explanation will be made of an embodiment of a disc-like molding apparatus according to the present invention with reference to the drawings in which:

DETAILED DESCRIPTION OF PREFERRED EMBODIMENTS OF THE INVENTION

Referring to FIGS. 1 to 5, an apparatus for molding disc-like molded rice foods is composed of a rice food supply mechanism A, rice food compressing mechanisms B, a cutting mechanism C for a compressed rice food, an intermittent transfer belt conveyer D, an intermittent feed belt conveyer E, a molding frame F, an opening and closing mechanism G and an elevating mechanism H for the molding frame F, a drive source for the opening and closing mechanism G a drive source J for the elevating mechanism H, and drive sources (which are not shown) for the rice food supply mechanism A, the rice food compressing mechanism B, the cutting mechanism C for the planar rice food, and the intermittent transfer belt conveyer D and the intermittent feed belt conveyer E.

Figure 5:
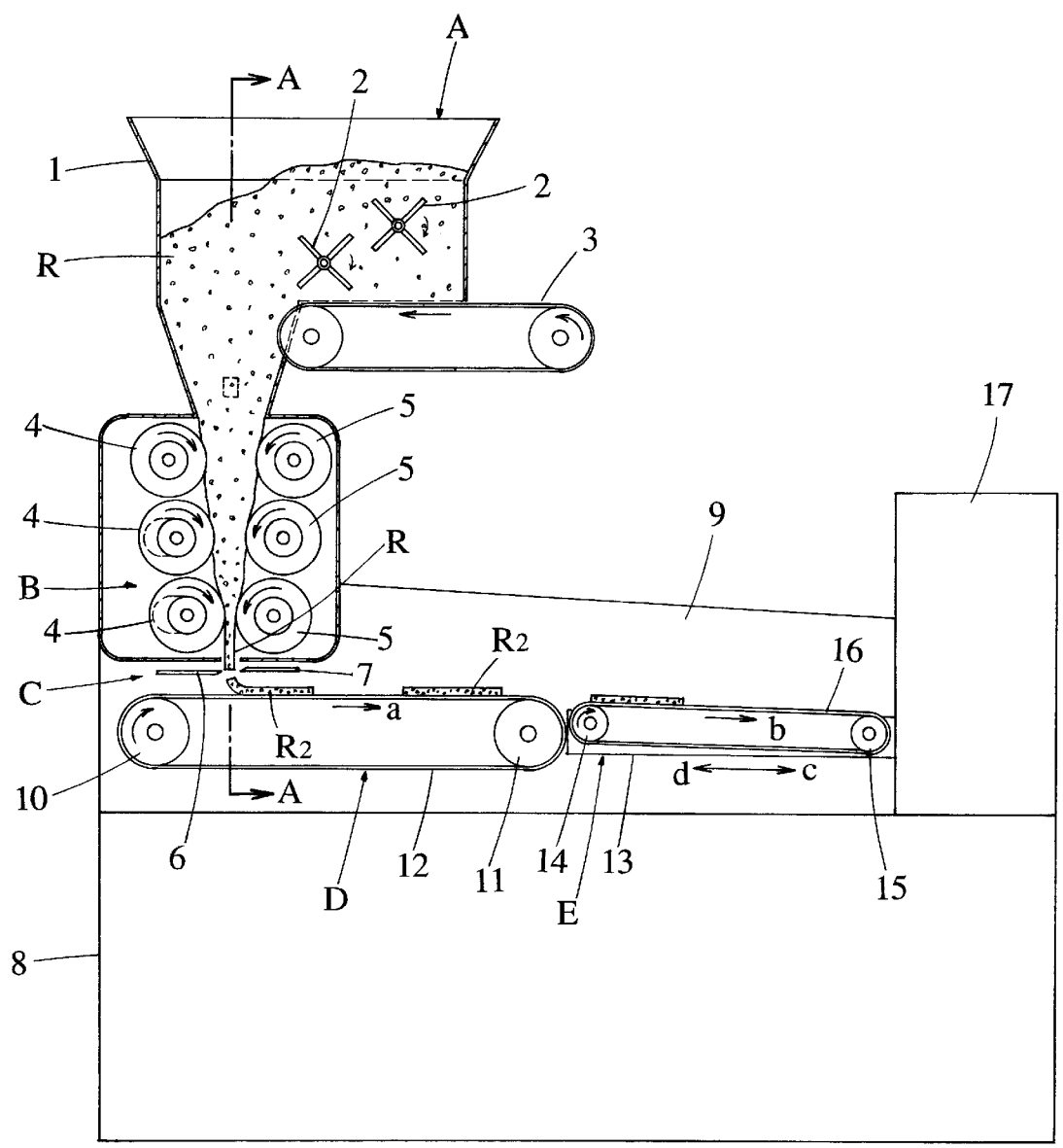
FIG. 5 is a side view illustrating the apparatus in its entirety.
Figure 6:
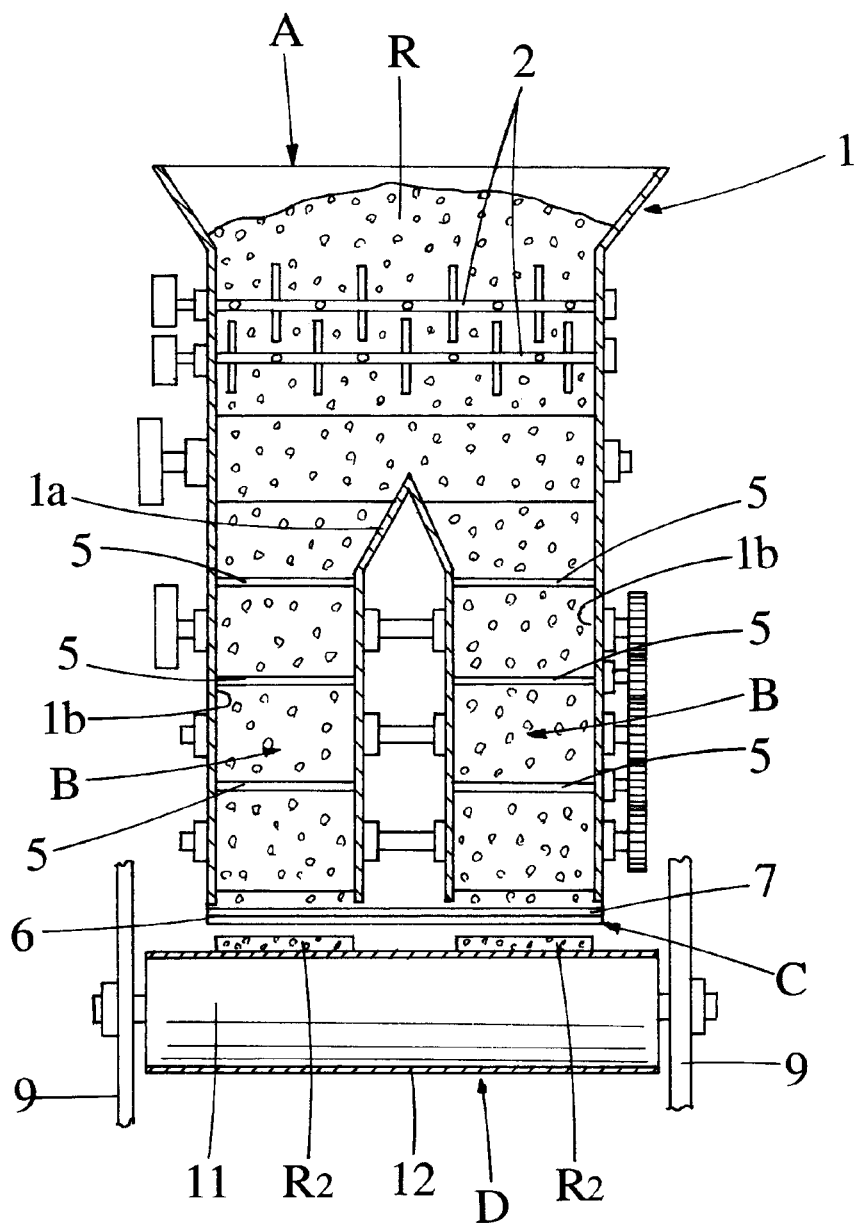
FIG. 6 is a sectional view as viewed in the directions of arrows in FIG. 5.

In the above-mentioned rice feed supply mechanism A, as shown in FIGS. 5 and 6, a rice food R in a rice food hopper 1 is loosened by agitating bars 2, 2 while it is fed by the rice food transfer belt conveyer 3 into the rice food compressing mechanism B therebelow.

Further, the rice food supply mechanism A, as shown in FIG. 6, is composed of a plurality (two in this embodiment as shown) of rice food supply passages 1b, 1b which are parted left and right from one another by inverted V-like partition panels 1a in the lower part of the rice food hopper 1.

In each of the rice food compressing mechanisms B, as shown in FIGS. 5 and 6, a plurality of rollers 4 . . . , 5 . . . are provided in a vertical direction at predetermined pitches and are arranged in a V-like shape as viewed in a front view, in both rice food supply passages 1b, 1b and in plural lows (two rows in this embodiment), being journalled and being opposed one another. With this arrangement, the rice food R fed from the rice food hopper 1 is compressed and formed into a rice food $R_1$ having a predetermined thickness.

Further, the rice food compressing mechanisms B in two rows may also include endless belts which are not shown and which are wound around the rollers 4 . . . , 5 . . .

In the cutting mechanism C, as shown in FIGS. 5 and 6, two pairs of cutters 6, 7 are provided at the lower end openings of the rice food compressing mechanisms B, B, being horizontally opposed to one another so as to be openable and closable. The cutters 6, 7 are opened and closed being driven by a drive source which is not shown, and accordingly, the compressed rice food $R_1$ is cut into two square planar rice foods $R_2$, $R_2$.

Further, in the intermittent transfer belt conveyer D, an endless conveyer belt 12 is wound around a drive roller 10 and a driven roller 11 which are journalled respectively to the rear parts and substantially intermediate parts of left and right side panels 9, 9 planted upright on a frame 8, being longitudinally and horizontally extended. The conveyer belt is intermittently rotated in a forward direction as shown by the arrow a (the right ward direction as viewed in FIG. 5), and the above-mentioned two planar rice foods $R_2$, $R_2$ are set on the conveyer belt 12, being juxtaposed widthwise of the conveyer belt 12, and are intermittently transferred forward.

Figure 3:
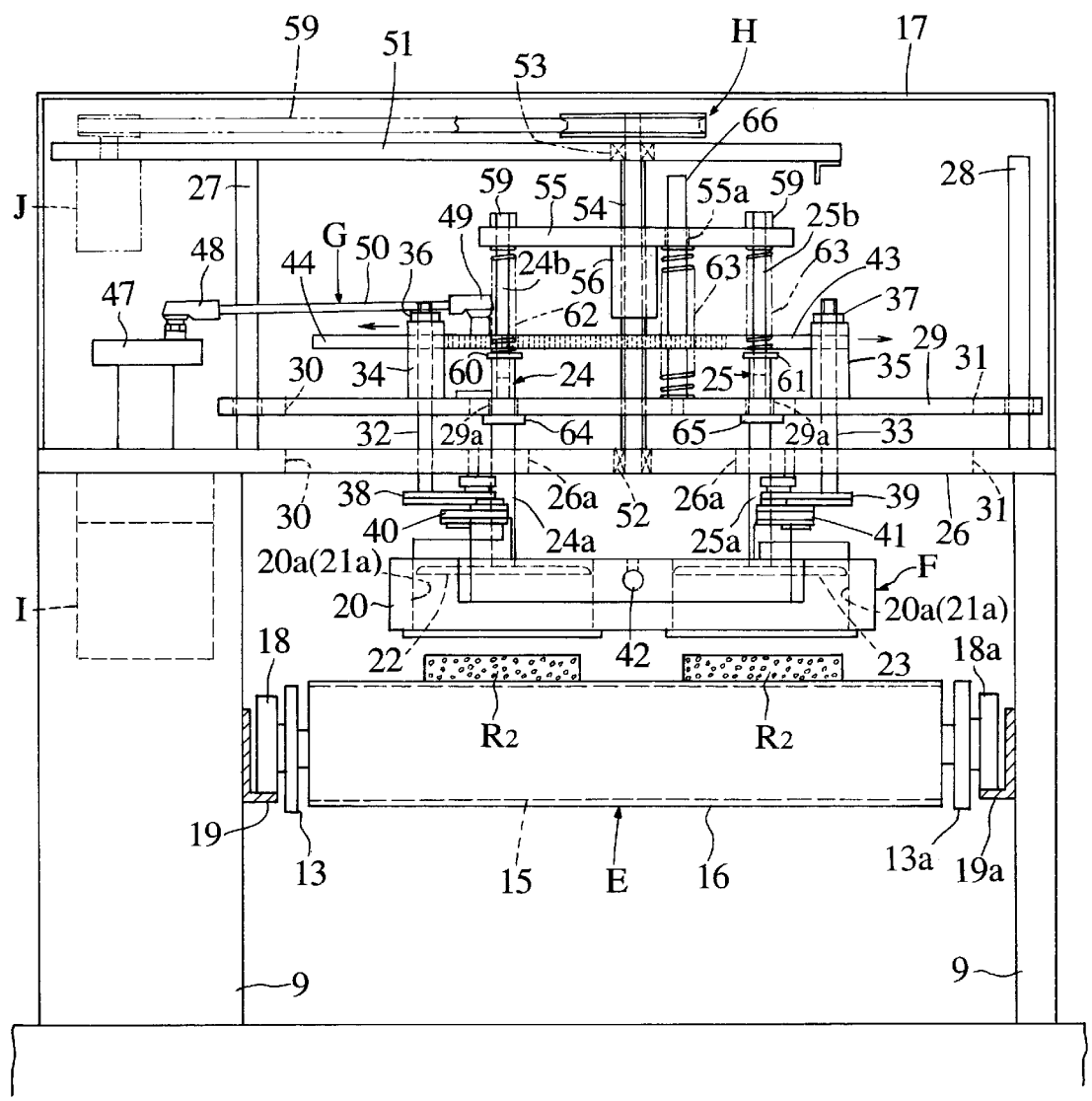
FIG. 3 is a front view illustrating the apparatus shown in FIG. 1.
Figure 4:
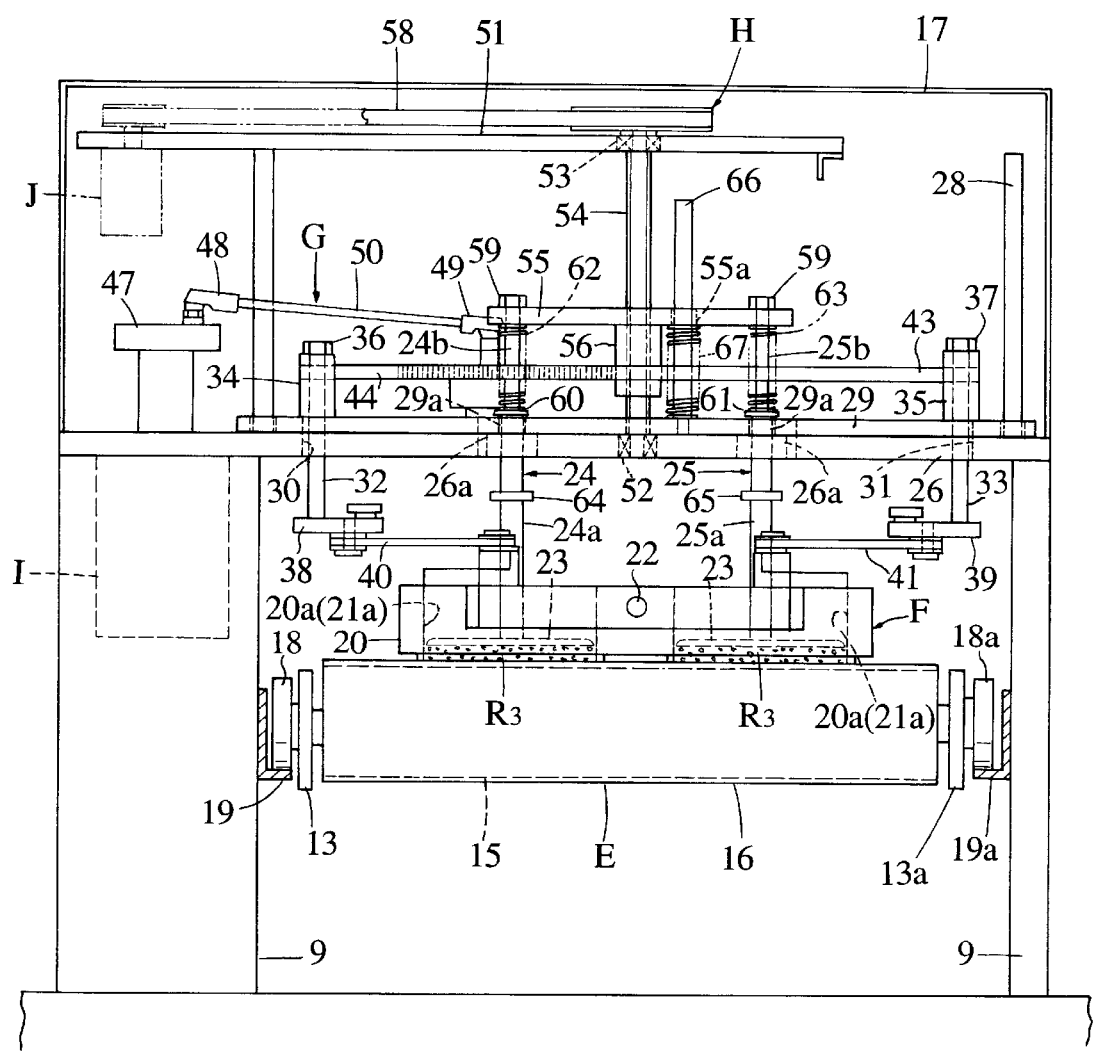
FIG. 4 is a front view illustrating the apparatus shown in FIG. 2.

In the intermittent feed belt conveyer E for the planar rice foods $R_2$, $R_2$, as shown in FIGS. 3 to 5, the an endless conveyer belt 16 is wound around a drive roller 14 and a drive roller 15 which are journalled respectively to rear parts and front parts of left and right conveyer frames 13, 13 and is intermittently rotated by a drive source which is not shown, in a direction indicated by the arrow b (in the rightward direction as viewed in FIG. 5), being slightly inclined downward forward.

Further, in the intermittent feed belt conveyer E, as shown FIGS. 3 and 4, a plurality (two in this embodiment as shown in the figures) of planar rice foods $R_2$, $R_2$ are set being widthwise juxtaposed to one another, and having a width with which the planar rice foods $R_2$, $R_2$. Further, the conveyer E is configured so as to be longitudinally reciprocatable as indicated by the arrows c and e in FIG. 5, relative to a housing 17 in which the frame F, the opening and closing mechanism G and the elevating mechanism H for the frame F, and the drive sources I, J for the latter, are incorporated.

In a means for longitudinally moving the intermittent feed belt conveyer E, as shown in FIGS. 3 and 4, a plurality of rollers 18, 18a . . . which are journalled to the outer surfaces of left and right conveyer frames 13, 13 at predetermined intervals in the longitudinal direction are engaged with guide rails 19, 19a which are opposed to each other and which are attached to the opposite side panels 9, 9, being extended longitudinally of the latter. The conveyer E can be longitudinally reciprocated by a predetermined stroke.

The molding frame F, as shown in FIGS. 3 and 4, is composed of a pair of molding dies 20, 21 which are openable and closable, and a plurality (two in the embodiment as shown in the figures) of press boards 22, 23 which are elevatable.

Figure 1:
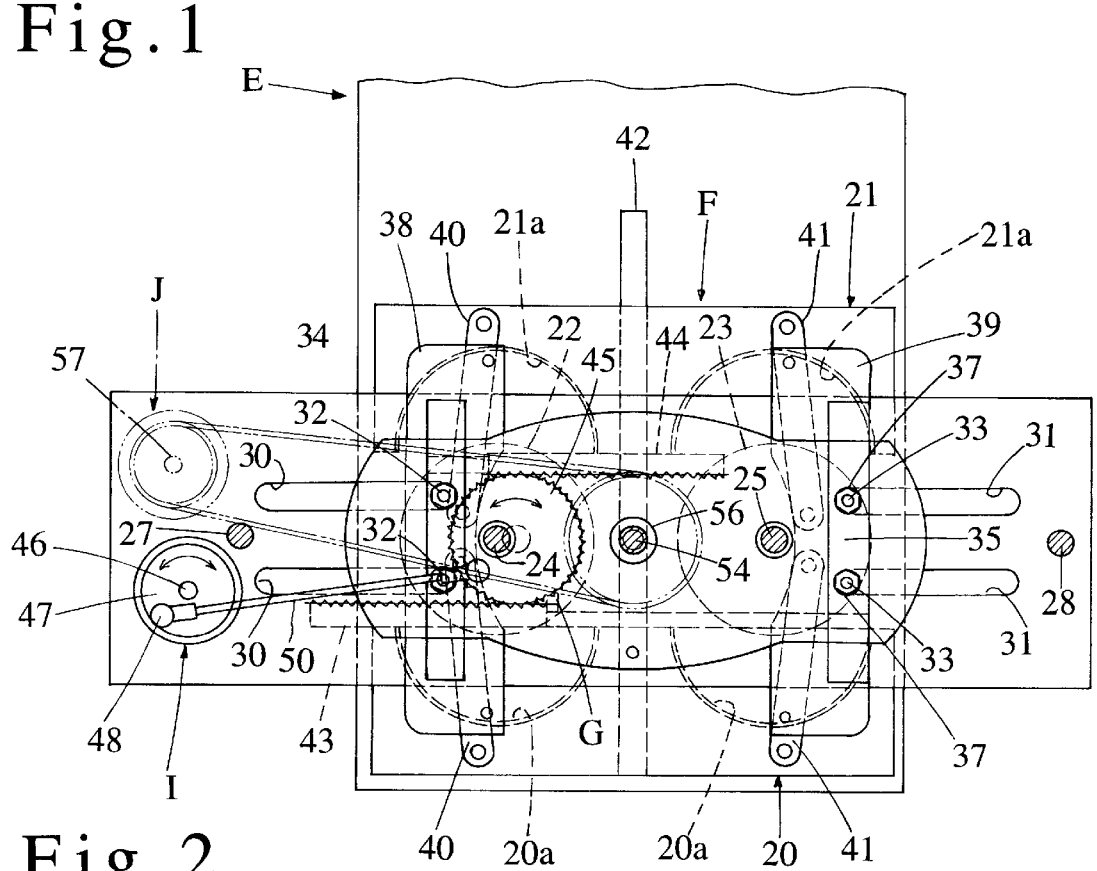
FIG. 1 is a cross-sectional view illustrating a main part of an embodiment of a disc-like rice food molding apparatus according to the present invention in a condition in which molding dies are opened.
Figure 2:
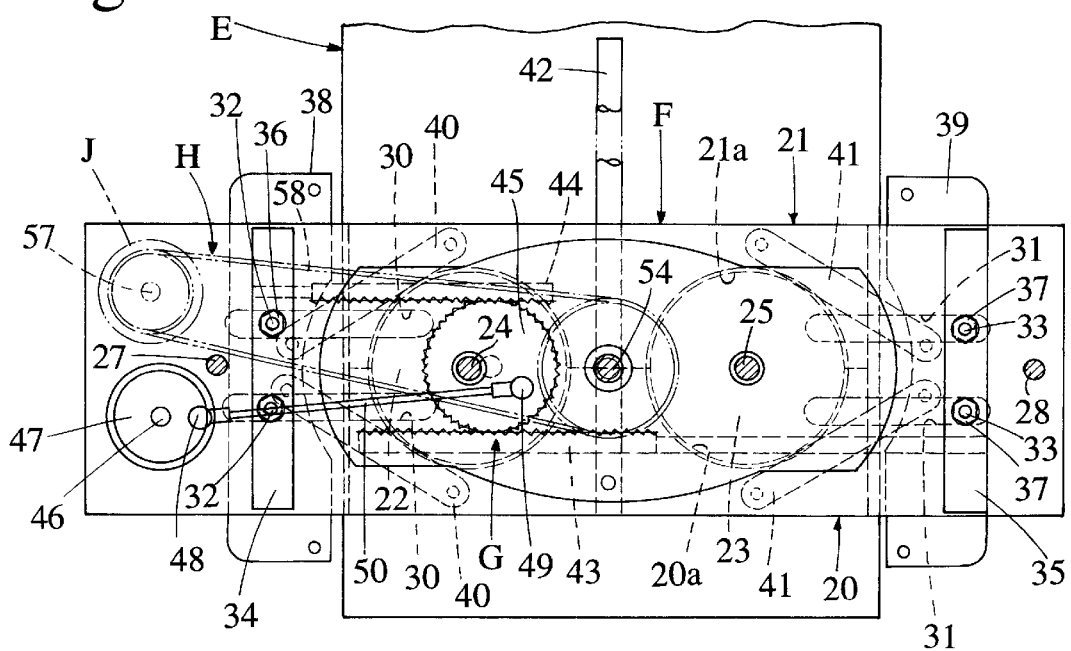
FIG. 2 is a cross-sectional view illustrating the apparatus shown in FIG. 1 in a condition in which the molding dies are closed.
Figure 7:
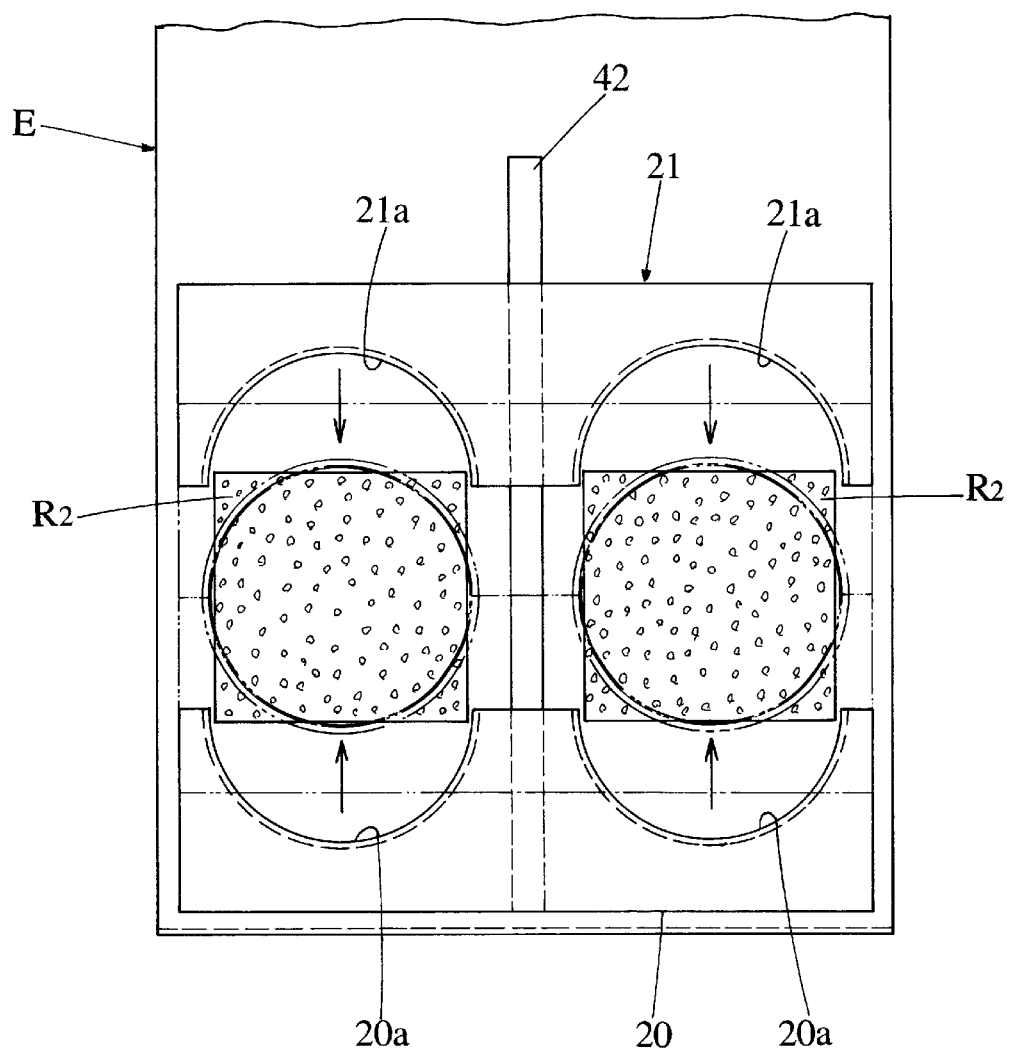
FIG. 7 is a plan view illustrating a molding condition of disc-like molded food by using a pair of molding dies in the apparatus.

The above-mentioned molding dies 20, 21, as shown in FIGS. 1, 2 and 7, are formed into square shapes, having their longitudinal directions extended widthwise of the intermittent feed belt conveyer E, from a thick planar plate, and having opposed parts formed therein with a plurality (two in each opposed part in the embodiment shown in the figures) of molding recesses 20a, 20a, 21a, 21a, which are outward symmetric with one another, having a semicircular shape as viewed in a plan view, and which are opposed to one another. One of these molding dies 20, 21, that is, the molding die 20 in this embodiment, has a horizontal guide rod 42 which is fixed to the widthwise center part thereof, and is extended through a guide hole 24a formed through the other one of the molding dies 20, 21, that is, the molding die 21 in this embodiment. With this arrangement, both molding dies 20, 21 are supported so as to be openable and closable in the longitudinal direction (or advancing direction) of the intermittent feed belt conveyer E.

The above-mentioned press boards 22, 23, as shown in FIGS. 1 to 4, are formed into disk-like shapes having diameters so as to be elevatably fitted in circular holes defined by the molding recesses 20a, 20a, 21a, 21a when the pair of molding dies 20, 21 are closed, and are fixed to the lower ends of push-down rods 24, 25 as components of the elevating mechanism H, being horizontally extended.

The opening and closing mechanism G, as shown in FIGS. 1 and 4, for the pair of molding dies 20, 21 is constituted as follows:

Pairs of laterally elongated holes 30, 30, 31, 31 which are spaced from one other by predetermined distances are formed in left and right side parts of a horizontal base board 26 at the lower end of the housing 17, and of a horizontal elevating panel 29 through which guide rods 27, 28 planted upright on the left and right parts of the base board 26 are extended in the opposite end parts thereof so that the horizontal elevating panel 29 is elevatable, being vertically extended therethrough. Slid rods 32, 32, 33, 33 which are extended through the elongated holes 30, 30, 31, 31 so as to be vertically slidable are fixed at their upper ends with slide blocks 34, 35 by nuts 36, 36, 37, 37, and the lower ends of the slide blocks 34, 35 are slidably engaged to the upper surface of the lower elevating panel 29 so that the slide rods 32, 32, 33, 33 are vertically held.

The slide rods 32, 32, 33, 33 are fixed at their lower ends with horizontal movable panels 38, 39, respectively, and pairs of links 40, 40, 41, 41 are rotatably journalled at their one end to both movable panels 38, 39 in front and rear of the longitudinally center part of the latter. The other end of the links 40, 40, 41, 41 is pivotally attached to the left and right sides of the longitudinally symmetric opposite end parts of both molding dies 20, 21 so as to be rotatable. With this arrangement, when both slide blocks 34, 35 are slid in symmetrically opposite directions, the pair of molding dies 20, 21 are opened and closed in the longitudinal direction of the intermittent feed belt conveyer E.

A pair of racks 43, 44 are arranged, being projected inward from opposite end parts of the slide blocks 34, 35 and being longitudinally spaced from each other by a predetermined distance. Both racks 43, 44 are meshed with a pinion 45 journalled to the upper surface of the lower elevatable panel 20 at their symmetric positions.

As shown in FIGS. 1 to 4, an eccentric position of a disc 47 fixed to a drive shaft 46 of the drive source I composed of a reversible motor or the like, and an eccentric position of the pinion 45 are associated and connected together by a drive rod 50 through the intermediary of universal joints 48, 49, and accordingly, when the disc 47 is normally or reversely rotated by a predetermined angle, the pinion 45 is normally and reversely rotated so as to drive the pair of racks 43, 44 in opposite directions, and accordingly, the pair of the molding dies 20 are opened and closed in the longitudinal direction of the intermittent feed belt conveyer E, as mentioned above.

The elevating mechanism H is composed as follows:

As shown in FIGS. 1 to 4, a ball screw 54 which is rotatably and vertically supported to the center part of the base board 26 and a horizontal support board 51 fixed to the upper part of the housing 17, by means of bearings 52, 53, is threadedly engaged with a ball nut 56 fixed to an upper elavatable panel 55, and the ball screw 54 and the drive source J are associated and coupled together by means of a winding type transmission mechanism 58 including a belt, a chain or the like so that the ball screw 54 is normally and revesely rotated.

The push-down rods 24, 25 are composed of hollow large diameter rod parts 24a, 25a and small diameter rod parts 24b, 25b which are fitted in the rod parts 24a, 25a so as to be axially extendable and retractable, and are inserted through rod holes 26a, 26a, 29a, 29a vertically extended through the base bard 26 and the lower elevatable panel 29. Further, the upper elevatable panel 55 is fixed to the upper ends of the upper small diameter rod parts 24b, 25b by nuts 59, 59 so as to be horizontally extended, and compression springs 62, 63 which are engaged at one end thereof to spring retainers 60, 61 fixed to the upper ends of the large diameter rod parts 24a, 25a, and at the other end thereof to the upper elevatable panel 55 are fitted on the small diameter rod parts 24b, 25b. Accordingly, when the upper elevatable panel 55 is lowered, both press boards 22, 23 and the push-down rods 24, 25 are at first depressed through the intermediary of the compression springs 62, 63, and then, they are directly depressed. That is the press boards 22, 23 are depressed through two stages.

Further, the push-down rods 24, 25 are provided at their substantially intermediate parts with flanges 64, 65 for pushing up the lower elevatable panel 29.

A guide rod 66 is fixed vertically upright to the lower elevatable panel 29 in the vicinity of the center part of the latter, being extended through a through-hole 55a in the upper elevatable panel 55 so as to be slidable therethrough, and a return compression spring 67 having opposite ends engaged respectively with the upper and lower elevatable panels 29, 55, for the upper elevatable panel 55, the push-down rods 24, 25 and the press boards 22, 23 is fitted on the guide rod 66.

Figure 8:
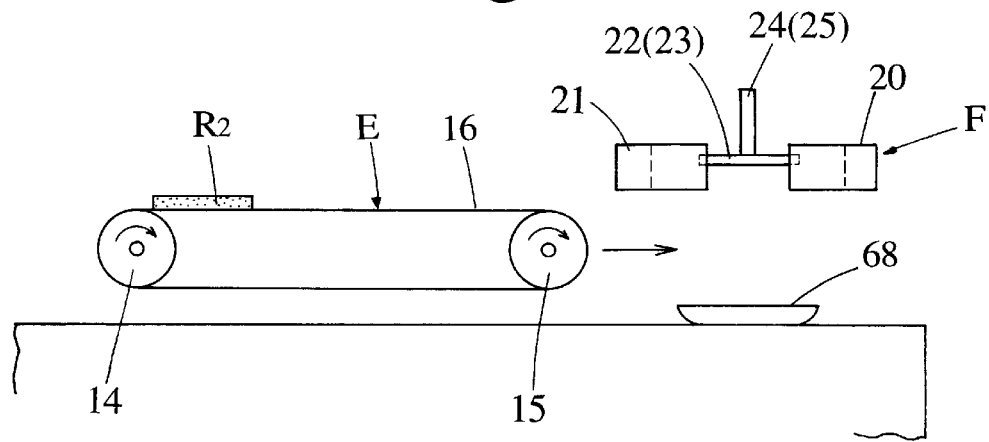
FIG. 8 is a view for explaining such a condition that both molding dies in the apparatus are opened and are held being stopped together with press boards in an elevated position.
Figure 9:
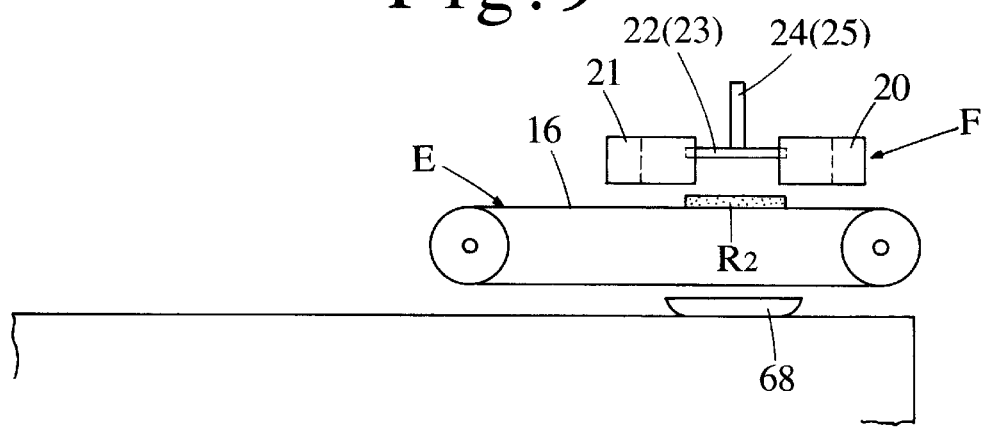
FIG. 9 is a view for explaining such a condition that both molding dies in the apparatus are opened and a planar rice food is transferred to a position below the press boards.

According to the molding apparatus having the above-mentioned arrangement, the compressed rice foods $R_1$, $R_1$ which have been fed from the rice food supply mechanism A and compressed to a predetermined thickness by the rice food compressing mechanisms B, B, are cut by the cutting mechanism C into square planar rice foods $R_2$, $R_2$ having predetermined sizes, which are then transferred by the intermittent transfer belt conveyer D onto the intermittent feed belt conveyer E that is moved forward while it is forward rotated, as indicated by the arrow in FIG. 8. Thus, the two planar rice foods $R_2$, $R_2$ are transferred to and stopped at positions below the pair of molding dies 20, as shown in FIG. 9. At this time, both molding dies 20, 21 are held, being opened, at their raised position as shown in FIGS. 1, 7, 8 and 9, and the press boards 22, 23 are also held at its raised position.

Figure 10:
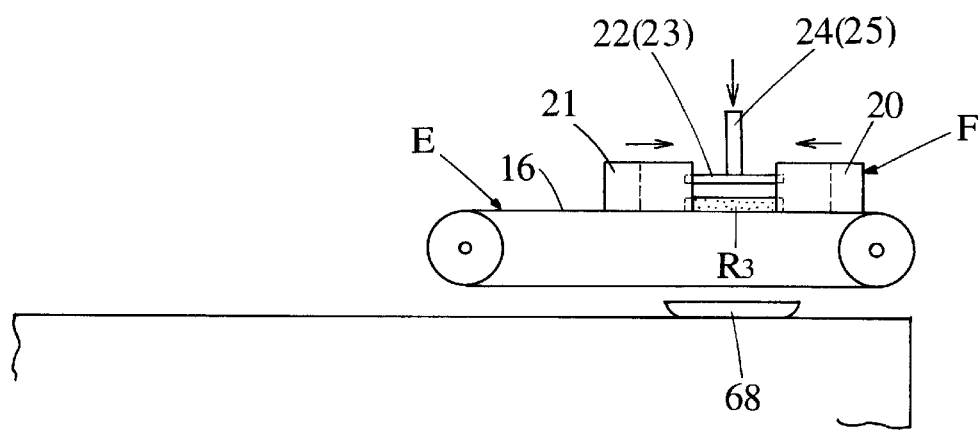
FIG. 10 is a view for explaining a condition such that both molding dies are opened in the apparatus, and the press boards are lowered.

When the elevating mechanism H is operated so as to lower the upper elevatable panel 55 is lowered, the lower elevatable panel 29 is depressed through the intermediary of the compression spring 67, and the press boards 22, 23 are depressed through the intemediary of the push-down rods 24, 25. Thus, the lower elevatable panel 29 abuts against the upper surface of the base board 26, as shown in FIG. 4, and accordingly, the lowering motion thereof is stopped. Further, both molding dies 20, 21 are lowered and stopped at a position where they abut against the upper surface of the conveyer belts 16. Thus, a condition shown in FIGS. 4 and 10 is effected.

Figure 11:
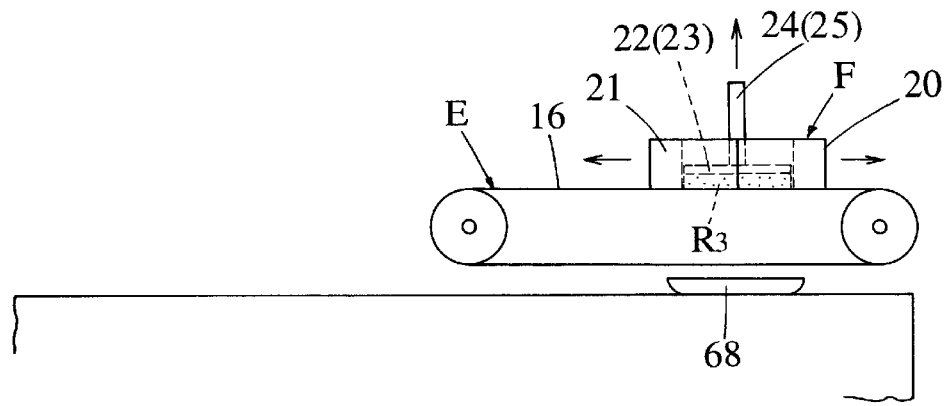
FIG. 11 is a view for explaining such a molding condition of a disc-like molding food that both molding dies are closed, and the press boards are lowered.

When the opening and closing mechanism G is operated so as to close both molding dies 20, 21 as indicated by two dots chain lines in FIGS. 11 and 17, the external shapes of the planar rice foods $R_2$, $R_2$ are compressed and molded by the molding recesses 20a, 21a, 20a, 21a of both molding dies 20, 21.

Since the press boards 22, 23 are still depressed through the intermediary of the push-down rods 24, 25 even after the both molding dies 20, 21 come to a stop at the lowered position, the planar rice foods $R_2$, $R_2$ are pressed downward by the press boards 22, 23 when their external shapes are molded by closing the molding dies 20, 21, and accordingly, the planar rice foods $R_2$, $R_2$ are molded into disc-like molded rice foods $R_3$ having a predetermined diameter and thickness, as shown in FIGS. 7 and 11.

Figure 12:
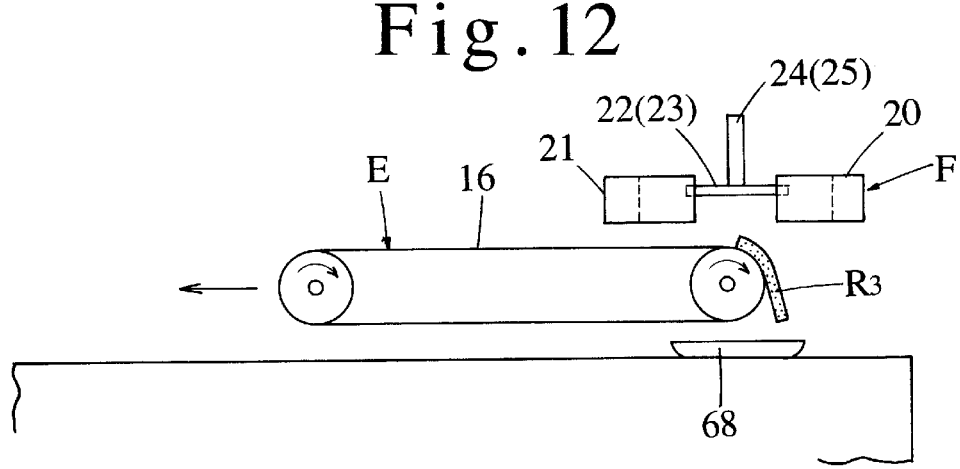
FIG. 12 is a view for explaining a condition such that both molding dies are opened after molding of the disc-like molded rice food, and the press boards are raised while the disc-like molded rice food is dropping from the intermittent feed belt conveyer.

After the opening and closing mechanism G is reversely operated so as to open both molding dies 20, 21, the elevating mechanism H is operated so as to raise both molding dies 20, 21 and both press bards 22, 23, and are then held at their raised positions, as shown in FIG. 12, and accordingly, the disc-like molded rice foods $R_3$ are parted from the dies.

Figure 13:
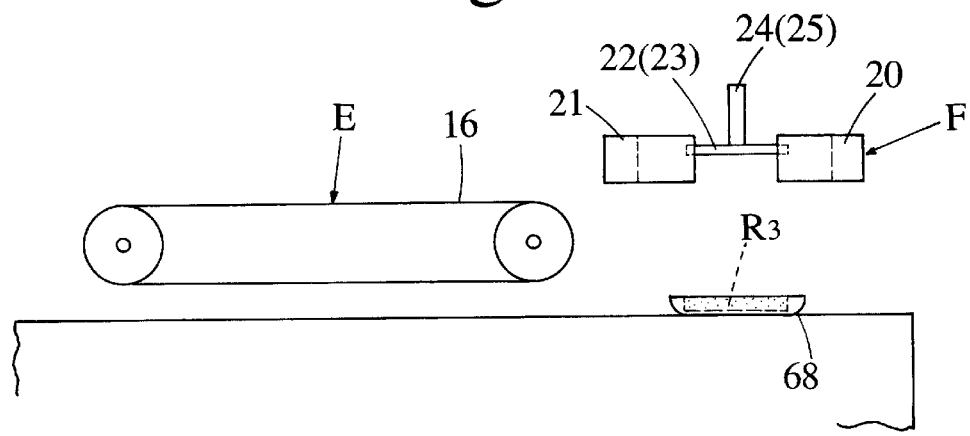
FIG. 13 is a view for explaining such a condition that the intermittent feed belt conveyer is retracted while being rotated, and the disc-like molded rice food is fed onto a receiving pan.

Next, the intermittent feed belt conveyer E is rotated forward while is retracted as shown in FIG. 12, and accordingly, the disc-like molded rice foods $R_3$ are dropped and fed from the conveyer belt 16 of the intermittent belt conveyer E into a receiving pan 68 as shown in FIG. 13.

Since the apparatus according to the present invention is constructed as mentioned above, a plurality of disc-like molded rice foods can be formed by the plurality of molding recesses formed in the opposed parts of the pair of molding dies which are opened and closed, longitudinal of the intermittent feed belt conveyer, and accordingly, the apparatus can have a compact size in comparison with a conventional molding die apparatus in which molding dies are opened and closed in the widthwise (crosswise) direction of an intermittent feed belt conveyer, thereby it is possible to aim at remarkable enhancing the molding efficiency so as to satisfactorily supply for large demands of disc-like molded rice foods. Further, since the molding can efficiently be made on a mass production base, the cost-down can also be made.

What is claimed is:

1. A molding apparatus for disc-like molded rice foods, comprising an intermittent feed belt conveyer which can be moved back and forth, for transferring compressed rice foods having a predetermined shape and fed thereonto, a molding frame composed of a pair of openable and closable molding dies having opposed parts formed therein with substantially semicircular molding recesses which are outward symmetric, and a plurality of press boards fixed to push-down rods so as to be horizontally extend and elevatable in the molding recesses in a condition in which both molding dies are closed, and an opening and closing mechanism and an elevating mechanism for the molding frame, wherein the molding dies are arranged so that the molding recesses are juxtaposed with each other, being spaced from one another by a predetermined distance widthwise of the intermittent feed belt conveyer.

\* \* \* \* \*